(12) United States Patent
Liu (10) Patent No.: US 7,489,936 B1
(45) Date of Patent: Feb. 10, 2009

(54) SYSTEM AND METHOD FOR LOCATING MOBILE TERMINALS IN MOBILE COMMUNICATION NETWORKS

(75) Inventor: Hui Liu, Lexington, MA (US)

(73) Assignee: Verizon Services Corp., Arlington, VA (US)

( * ) Notice: Subject to any disclaimer, the term of this patent is extended or adjusted under 35 U.S.C. 154(b) by 358 days.

(21) Appl. No.: 11/233,711

(22) Filed: Sep. 23, 2005

Related U.S. Application Data (60) Provisional application No. 60/618,884, filed on Oct. 14, 2004.

(51) Int. Cl.
*H04Q 7/20* (2006.01)
(52) U.S. Cl. .................... 455/456.1; 455/458
(58) Field of Classification Search ............ 455/422.1, 455/423, 432.1, 433, 456, 458, 515, 456.1–456.6; 340/7.1–7.59
See application file for complete search history.

(56) References Cited

U.S. PATENT DOCUMENTS 6,181,945 B1 * 1/2001 Lee .......................... 340/7.21

OTHER PUBLICATIONS

Yates R., Rose C., Minimizing the Average Cost of Paging Under Delay Constraints, Department of Electrical and Computer Engineering, Rutgers University, May 24, 1995, pp. 1-19.

Wang Wenye, Akyildiz Ian F., Stuber Gordon L., and Chung Boo-Young, Effective Paging Schemes with Delay Bounds as QoS Constraints in Wireless Systems, Wireless Networks 7, 455-466, Kluwer Academic Publishers, Manufactured in The Netherlands, 2001.

Lei Zhuyu, Saraydar Cem U., and Mandayam Narayan B., Paging Area Optimization based on Interval Estimation in Wireless Personal Communication Networks, Wireless Network Laboratory (WINLAB), Department of Electrical and Computer Engineering, Rutgers University, 1999, pp. 1-18.

Lee Hyun Jun, Jung Chul, and Lee Jai Yong, Optimized Paging Cache Mappings for efficient location management, ICITA2002 ISBN: 1-86467-114-9, pp. 1-5.

Seah Winston, Mobility Management In Mobile Cellular Networks, CS4274 Mobile Computing, Institute for Infocomm Research, pp. 1-8.

* cited by examiner

*Primary Examiner*—Lester Kincaid
*Assistant Examiner*—Steven Lim (57) ABSTRACT

In one of many possible embodiments, a method of locating a mobile terminal within a location area of a mobile communication network is provided. In the method, a threshold is set by calculating a sum of all location probabilities in the location area and dividing the sum by a maximum number of polling cycles allowed before the mobile terminal is located. Cells in the location area are arranged in non-ascending order according to their location probabilities. Multiple paging areas are formed one at a time by starting with a first cell not used in a previous paging area, grouping cells in order, and stopping when the total of location probabilities reaches the threshold or when no more ungrouped cells exist within the location area.

13 Claims, 9 Drawing Sheets

SYSTEM AND METHOD FOR LOCATING MOBILE TERMINALS IN MOBILE COMMUNICATION NETWORKS

RELATED APPLICATIONS

This application claims priority under 35 U.S.C. §119(e) to U.S. Provisional Patent Application Ser. No. 60/618,884, by Hui Liu, filed on Oct. 14, 2004, and entitled A SYSTEM AND METHOD FOR LOCATION AREA PLANNING IN MOBILE COMMUNICATION NETWORKS UNDER DELAY BOUND, the contents of which are hereby incorporated by reference in their entirety.

BACKGROUND INFORMATION

Wireless bandwidth is one of the most valuable resources in mobile communication networks. In many such networks, both communication traffic and control messages share a limited amount of wireless bandwidth. Unfortunately, control messages often require significant amounts of wireless bandwidth to ensure proper operation of the network. For example, to effectively provide communication services to mobile terminals, mobile communication networks typically use control messages to track and manage the locations of the terminals within the networks.

A typical mobile communication network (e.g., a cellular network) is made up of interconnected base stations that form a network backbone. Each base station provides wireless signal coverage for a specific geographic area, commonly referred to as a cell. Sets of network cells are grouped into location areas, which are used for tracking and managing the locations of mobile terminals (e.g., cellular telephones) in the network.

Mobile communication networks track mobile terminals through operations known as registration and paging. Registration refers to operations for updating the tracked location areas of mobile terminals, and paging refers to operations for locating mobile terminals in the tracked location areas. Unfortunately, conventional registration and paging operations often impose a significant load on wireless bandwidth resources, especially during times of high call volume or when networks provide service to significant numbers of mobile terminals.

With respect to the function of registering when a mobile terminal crosses a boundary of a location area, the mobile terminal registers its new location (a new location area) by providing updated location information to a location management database maintained by the network. Consequently, the network is typically aware of the location area in which a mobile terminal is located at all times.

The function of paging refers to the mobile communication network locating mobile terminals. For example, when a telephone call directed to a particular mobile terminal arrives at the mobile communications network, the network looks in the location management database to determine in which location area the terminal is located. The network then searches the identified location area to determine the specific cell in which the mobile terminal is located by broadcasting a paging message to all of the cells in the location area. The wireless terminal responds to the paging message and indicates its cell location. The mobile communication network then sends the incoming telephone call to the base station of the indicated cell so that the telephone call may be connected.

Both registration and paging operations impose costs on mobile communication networks, namely by reducing the overall available wireless bandwidth. The cost of registration is typically measured according to the number of registration operations performed, and the cost of paging is typically measured according to the number cells to which paging messages are broadcast before a mobile terminal is located.

Clearly, there is a tradeoff between the costs of registration and paging, and the tradeoff depends upon the size (i.e., the number of cells) of a location area. At one extreme, if each location area contains only one cell, paging costs will be at a minimum. However, registration costs will be at a maximum as wireless terminals register their new locations at every instance of moving from one cell to another. The other extreme occurs if the entire service area covered by the mobile communication network is defined as a single location area. In this scenario, registration costs will be at a minimum, but paging costs will be at a maximum because each paging operation would poll every cell in the network. Consequently, network designers carefully design location areas to balance the costs of registration and paging operations.

Several approaches have been introduced for minimizing paging costs without increasing registration costs. The existing approaches typically divide the cells of a location area into groups that may be polled sequentially until a mobile terminal is located. These groups of cells within a location area are commonly referred to as paging areas. Paging costs are reduced whenever the mobile terminal is located before every paging area in a location group is polled.

To increase the chance that the mobile terminal will be located early in the polling sequence, location probabilities are often used to prioritize cells or groups of cells that are relatively more likely to contain the mobile terminal. Accordingly, paging messages are theoretically broadcast to the paging areas sequentially, generally starting with the paging area having the highest probability of containing the mobile terminal and moving through the paging areas in decreasing order of location probabilities. Delay bounds have been imposed in several such existing approaches in order to ensure that the mobile terminal is found within an acceptable amount of time.

While existing probability-based paging approaches (e.g., reverse paging, semi-reverse paging, selective paging, and uniform paging) have generally helped to reduce the average costs of paging operations in many mobile communication networks, the level of success of each of the existing approaches is dependent upon factors such as network architectures, location distribution patterns of mobile terminals, Quality of Service ("QoS") requirements, and network applications, For example, a particular paging approach may perform better for uniform location probability distributions than for irregular location probability distributions. Accordingly, network designers often select a paging approach based on its predicted performance as applied to the specific characteristics of a mobile communications network.

Given the vast range of different types and applications of mobile communications networks, there exists at least a need for additional paging processes so that network designers have increased options for matching the most effective paging technique to a particular mobile communication network. It would be desirable to have a paging approach that effectively reduces paging costs for a wide variety of location distribution patterns, network architectures, and network applications. It would be further desirable for the paging approach to effectively locate mobile terminals while remaining within a predetermined delay bound of a network.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Overview

A system and method for locating mobile terminals in mobile communication networks under delay bound is disclosed. More specifically, the system and method (collectively the "system") provide a process of forming and polling paging areas in a manner that generally reduces average paging costs while keeping delays within a predetermined bound. Paging cost refers to the average amount of wireless bandwidth used for paging operations, which is directly related to the number of cells the network has to page in order to locate a mobile terminal.

As discussed below in greater detail, a threshold may be set based on both location probabilities of cells within a location area and a predetermined delay bound. Location probabilities refer to quantified probabilities of a mobile terminal (e.g., a cellular telephone) being at a particular location (e.g., within a particular cell) within a location area of a mobile communication network. Delay bound refers to a predetermined maximum number of paging cycles (also referred to as "paging broadcasts" and "polling cycles") that may be performed before locating a mobile terminal in the location area.

Cells in the location area are arranged in non-ascending order according to their location probabilities. Multiple paging areas may be formed one at a time by starting with a first cell not used in a previous paging area, grouping cells in order, and stopping formation of a paging area when a total of location probabilities of cells in a group reaches the threshold or when no more ungrouped cells exist within the location area. In some embodiments, the formed paging areas are polled in the same order in which they were formed. By forming and polling paging areas in this manner, the system is able to conserve wireless bandwidth by generally reducing average paging costs for a wide variety of probability distributions and network architectures. Further, the system is able to keep paging delays within the predetermined bound. In other words, wireless bandwidth may be conserved while satisfying Quality-of-Service ("QoS") requirements such as a maximum allowable call setup time.

II. Introduction of Elements

Figure 1:
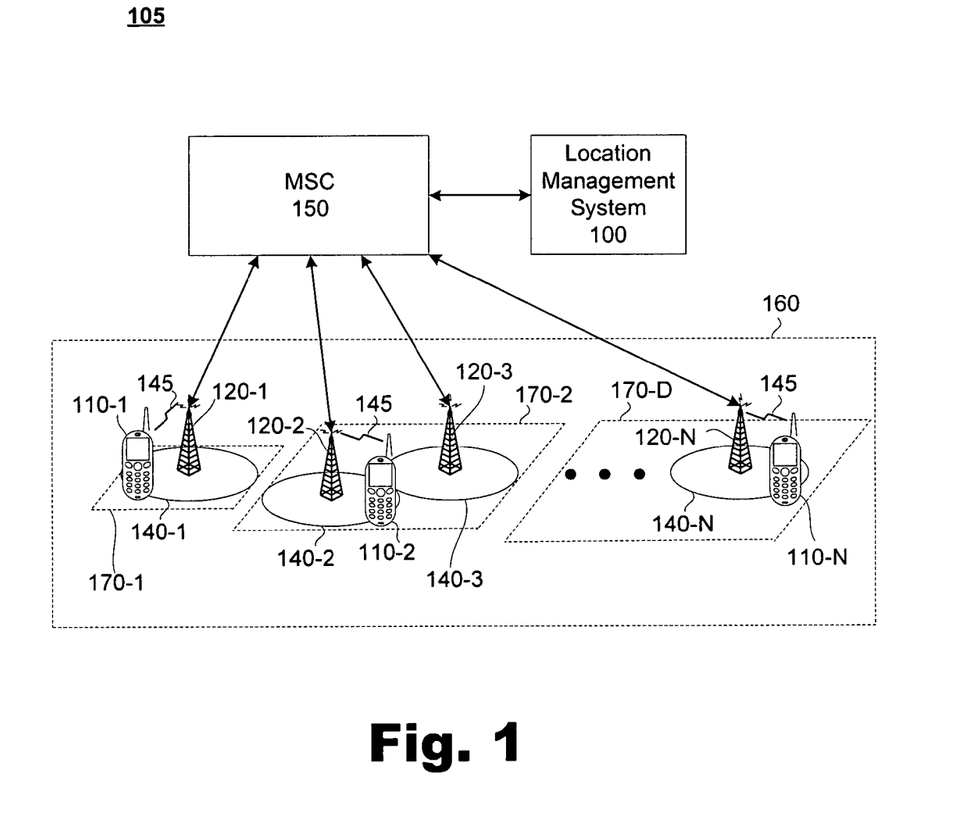
FIG. 1 is a block diagram illustrating an example of a location management system implemented in an example of a mobile communication network, according to one embodiment.

The present system and method may be implemented in any suitable mobile communication network that is capable of performing location management functions to track and locate mobile terminals. FIG. 1 is a block diagram illustrating an example of a mobile communication network 105 having an exemplary location management system 100 (also referred to as simply "the system 100") implemented therein, according to one embodiment. As shown in FIG. 1, the mobile communication network 105 may include mobile terminals 110-1 through 110-N (collectively "the mobile terminals 110") and base stations 120-1 through 120-N (collectively "the base stations 120") arranged to form respective cells 140-1 through 140-N (collectively "the cells 140"). The mobile terminals 110 and base stations 120 communicate by way of wireless network signals 145, with each base station 120 being configured to provide two-way wireless connectivity to any of the mobile terminals 110 located within the respective cell 140 formed by the particular base station 120.

In addition, each of the base stations 120 is communicatively coupled to an upstream mobile switching center ("MSC") 150.

As further shown in FIG. 1, the cells 140 are located within a location area 160. In addition, subsets of the cells 140 are partitioned into paging areas 170-1 through 170-D (collectively "the paging areas 170). More specifically, cell 140-1 is located in paging area 170-1, cells 140-2 and 140-3 are located in paging area 170-2, and the remainder of the cells 140 up to cell 140-N are located in paging area 170-D. As discussed in detail below, the system 100 is able to form the paging areas 170 based on location probabilities and predetermined delay bound ("D").

The mobile communication network 105 may be in the form of a wide variety of different types of wireless communication networks. More specifically, the mobile communication network 105 may include any suitable wireless technology that enables wireless communication between mobile terminals 110 and base stations 120 by way of wireless network signals 145. For example, the mobile communication network 105 may use radio frequency ("RF") signals and/or other forms of wireless communication signals. The mobile communication network 105 may be in the form of a cellular network using known cellular technologies, including code division multiple access ("CDMA"), time division multiple access ("TDMA"), global system for mobile communication ("GSM"), and advanced mobile phone service ("AMPS"), to name a few.

While an exemplary implementation of the system 100 is shown in FIG. 1, those skilled in the art will recognize that the exemplary components illustrated in the Figure are for purposes of illustration and not intended to be limiting. Indeed, those skilled in the art will recognize that other alternative hardware environments may be used in other embodiments. Each element of the mobile communication network 105 shown in FIG. 1 will now be discussed in greater detail.

A. Mobile Terminals

Mobile terminals 110 may include any device or devices capable of communicating with the base stations 120 by way of wireless network signals 145. Accordingly, as known to those skilled in the art, the mobile terminals 110 may employ wireless communications technologies and components such as, but not limited to, radio frequency (RF) tuners, transceivers, analog-to-digital converters, digital-to-analog converters, upconverters, downconverters, signal modulators, filters, amplifiers, attenuators, antennae, encoders, decoders, multiplexers, demultiplexers, and signal processors. The mobile terminals 110 may include analog and/or digital signal transmission capabilities.

The mobile terminal 110 may be in the form of a cellular telephone, personal digital assistant, laptop computer, desktop computer, mobile communication network interface card, personal computer, dedicated computer device, gaming station, wireless e-mail enabled device, satellite pager, wireless internet device, embedded computer, video phone, mainframe computer, mini-computer, programmable logic device, vehicle, entertainment device, and other future wireless devices that may not yet currently exist.

As known to those skilled in the art, each of the mobile terminals 110 may be equipped to transmit registration messages whenever the mobile terminal 110 is physically moved from one location area (e.g., location area 160) to another Registration messages may be transmitted to the base stations 120, which may relay the messages to the location management system 100 by way of the MSC 150.

B. Wireless Network Signals

The wireless network signals 145 may be in any format capable of carrying information (e.g., voice, data, video, and control messages) over a wireless medium and between the different devices interconnected by the mobile communication network 105. The wireless network signals 145 may be in the form of RF signals.

The wireless network signals 145 preferably support two-way transmission of voice and/or data between the mobile terminals 110 and the base stations 120. For example, the wireless network signals 145 may include RF waves of different frequencies, with a first subset of the RF waves carrying downstream signals and a second subset of the RF waves carrying upstream signals. Accordingly, communication (e.g., voice and data) and control signals may be transported simultaneously between mobile terminals 110 and base stations 120 in both upstream and downstream directions. As known to those skilled in the art, the control signals may be used to carry registration and paging messages for purposes of managing the locations of the mobile terminals 110 in the mobile communication network 105.

C. Base Stations

The base stations 120 are configured to transmit and receive the wireless network signals 145 to and from the mobile terminals 110. The base stations 120 may include any wireless network access point. In many embodiments, each of the base stations 120 includes an RE transceiver and at least one antenna capable of transmitting and receiving RF signals. The base stations 120 may include cellular technologies useful for transmitting and receiving cellular signals to and from the mobile terminals 110.

The base stations 120 may be equipped with any known technology for communicating with the MSC 150. This allows the base stations 120 to relay information back and forth between the MSC 150 and the mobile terminals 110. In particular, registration and paging messages can be relayed between the MSC 150 and the mobile terminals 110.

D. Cells

As shown in FIG. 1, each of the cells 140 includes at least one of the base stations 120. Each of the cells 140 is defined as a particular geographic region within which mobile terminals 110 can generally communicate with the particular base station 120 associated with the particular cell 140. Cells 140 are well known to those skilled in the art.

E. Location Areas

The cells 140 of FIG. 1 are located in the location area 160. As known to those skilled in the art, the location area 160 may be used for location management functions such as registration and paging. For example, when any particular mobile terminal 110 is moved in or out of the location area 160, the mobile terminal 110 will send a registration message with updated location information to the location management system 100 via the MSC 150. The system 100 may use the registration message to update previously stored location data associated with the mobile terminal 110. In this manner, the system 100 is aware of the location area 160 in which any once of the mobile terminals 110 is located. The system 100 may employ any known registration technique for tracking the locations of the mobile terminals 110.

Network designers or operators may define the location area 160 to include any particular group of cells 140. While FIG. 1 shows only one location area 160 containing all the cells 140 associated with the MSC 150, this is not intended to be limiting. For example, the cells 140 served by the MSC 150 may be partitioned into multiple location areas 160, and the location area 160 may be defined to contain any number of cells 140 suitable for any particular network application.

F. Paging Areas

Each of the paging areas 170 includes a group of the cells 140 that will receive an essentially simultaneous paging broadcast, which is also referred to as a paging or polling cycle. For example, a single paging cycle may include an essentially simultaneous broadcast of a paging message to every one of the cells 140 located in the paging area 170-1, which in FIG. 1 includes only cell 140-1. Another paging cycle may include an essentially simultaneous broadcast of a paging message to every one of the cells 140 located in the paging area 170-2, which in FIG. 1 includes cells 140-2 and 140-3. A paging area is no bigger than a location area.

The paging areas 170 may be polled sequentially until a target mobile terminal 110 is located. For example, a paging message may be broadcast first to paging area 170-1. If the target mobile terminal 110 is not found in paging area 170-1, a paging message may then be broadcast to paging area 170-2, and so on until the target mobile terminal 110 is located. When the target mobile terminal 110 receives the paging message, the terminal 110 sends a response identifying the particular cell 140 in which the terminal 110 is located.

By partitioning the cells 140 of the location area 160 into paging areas 170 and sequentially polling the paging areas 170, the system 100 avoids having to simultaneously broadcast a single paging message to every cell 140 in the location area 160. This generally reduces the average expected bandwidth costs associated with paging operations because many paging operations are able to be performed without having to poll every cell 140 in the location area 160. In other words, the average number of cells 140 polled to locate a wireless terminal 110 is generally reduced, thereby freeing up wireless bandwidth for other uses.

Moreover, the system 100 may further reduce expected paging costs by sequentially polling the paging areas 170 based on location probabilities associated with the cells 140. The paging area 170 having the highest probability of containing the target mobile terminal 110 may be polled first, thereby increasing the chances of the terminal 110 being located early in the sequence of polling the paging areas 170. An exemplary process for forming and polling the paging areas 170 will be discussed below.

G. Mobile Switching Center

The mobile switching center ("MSC") 150 is communicatively connected to the base stations 120. Any suitable communications medium may be employed to establish communications between the MSC 150 and the base station 120, including wireless signals of the mobile communication network 105. The MSC 150 may be configured to perform any function known to those skilled in the art, including selectively instructing the base stations 120, or subsets of the base stations 120, to broadcast paging messages.

H. Location Management System

The location management system 100 may be implemented as part of the MSC 150 or as part of any suitable device or devices communicatively coupled to the MSC 150, as shown in FIG. 1. Alternatively, the system 100 may be implemented as part of any other device or devices of the mobile communication network 105. The system 100 may include any computer hardware and/or instructions (e.g., software programs), or combinations of software and hardware, helpful for the performance of the location management processes described herein. In particular, it should be understood that the system 100 may be implemented on one physical computing device or may be implemented on more than one physical computing device. Accordingly, the system 100 may include any one of a number of computing devices known to those skilled in the art, and may employ any of a number of computer operating systems known to those skilled in the art, including, but by no means limited to, known versions and/or varieties of the Microsoft Windows® operating system, the Unix operating system, and the Linux operating system.

Accordingly, those skilled in the art will recognize that the various processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The system 100 may be configured to perform any known registration function. In particular, the system 100 may be configured to receive and store registration messages having updated location data for the mobile terminals 110. The system 100 may include a data store (not shown), such as one or more databases, configured for storage of the location data associated with the mobile terminals 110. In this manner, the system 100 may maintain an up-to-date record identifying the location areas 160 in which the mobile terminals 110 are located.

The system 100 may also be configured to determine location probabilities associated with the mobile terminals 110. Any known technique may be employed for determining a quantified probability that a particular mobile terminal 110 is located in any of the cells 140 of the location area 160. For example, any known mathematical models, techniques for tracking calling patterns and/or mobility patterns, and empirical data models may be used. In one embodiment, the system 100 tracks call patterns of the mobile terminals 110 and uses the information to determine location probability distributions for the cells 140 of the location area 160. The location probabilities preferably identify a numerical probability of a particular mobile terminal 110 being located within any particular cell 140 of the location area 160.

The system 100 is configured to index and store location probability distributions for each of the mobile terminals 110, based on probability values. In particular, the system 100 may index the cells 140 of a location area 160 to arrange their location probability values in non-ascending order. For example, Table 1 illustrates an example of an indexed location probability distribution of a particular mobile terminal 110 for a particular location area 160 having ten cells 140. As shown in Table 1, the location probabilities include a probability value assigned to each of the ten cells 140, and the cells 140 have been indexed based in non-ascending order of their location probabilities. In the example shown in Table 1, the sum of the location probabilities is "1.0." The system 100 may dynamically or periodically update and/or index the location probability distributions to reflect new location data for each of the mobile terminals 110.

TABLE 1

| Exemplary Set of Indexed Cell Location Probabilities | | | | |
| --- | --- | --- | --- | --- |
| Cell No. | 1 | 2 | 3 | 4 | 5 |
| Probability | 0.3 | 0.2 | 0.15 | 0.10 | 0.05 |
| Cell No. | 6 | 7 | 8 | 9 | 10 |
| Probability | 0.05 | 0.05 | 0.04 | 0.03 | 0.03 |

The system 100 may also store delay bound data, which may be defined by network designers or operators. As mentioned above, delay bound refers to a maximum limit on the number of paging cycles that may be performed before a wireless terminal 110 is located. The delay bound may be defined to guarantee that required network QoS parameters (e.g., call setup time) are not violated by paging operations.

In addition, the delay bound may be used to form the paging areas 170 in a manner that prevents polling operations from violating required QoS parameters. In particular, the delay bound may be used to dictate the maximum number of paging areas 170 that may be formed and sequentially polled without exceeding the delay bound. An exemplary process of forming the paging areas 170 will be discussed further below.

Once the system 100 has formed the paging areas 170, the system 100 may provide corresponding paging area data to the MSC 150, which may then store the paging area data and use the paging area data to direct sequential broadcasts of paging messages to the paging areas 170. In some embodiments, the paging areas 170 are polled in the same order in which they are formed.

III. Process Flow View

Figure 2:
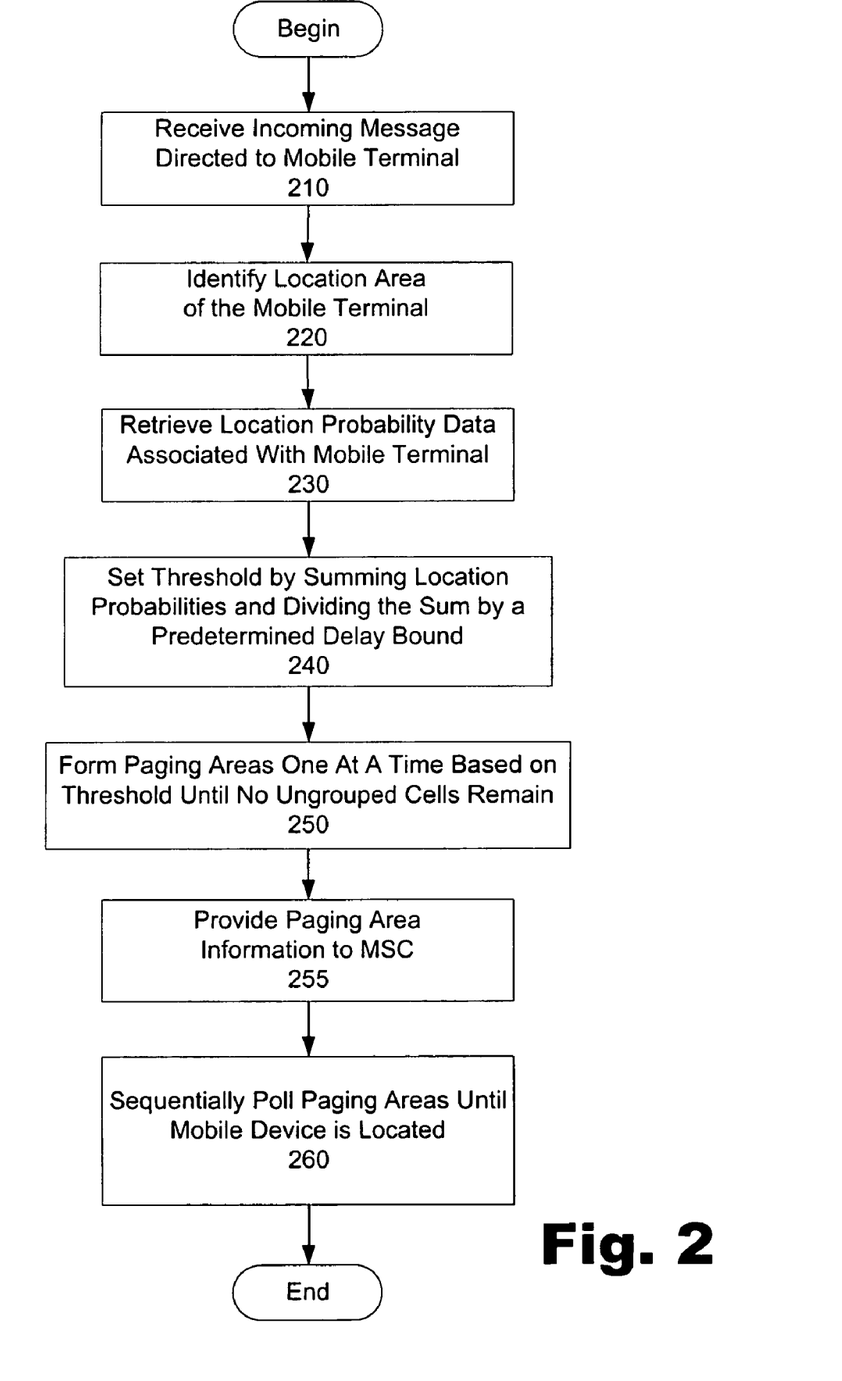
FIG. 2 is a flowchart illustrating an example of a process for locating a mobile terminal in a location area of the mobile communication network of FIG. 1.

FIG. 2 is a flowchart illustrating an example of a process for locating any particular mobile terminal 110 in any particular location area 160 of the mobile communication network 105. The process includes forming the paging areas 170. While FIG. 2 illustrates exemplary steps according to one embodiment, other embodiments may omit, add to, and/or modify any of the steps shown in FIG. 2. In some embodiments, the process of FIG. 2 is performed for every polling request. In other embodiments, steps 210-255 of the process of FIG. 2 are performed periodically and used when subsequent polling requests are received. Periodic performance of steps 210-255 of the process of FIG. 2 conserves resources by using periodically determined paging area information for multiple polling requests.

The process of FIG. 2 begins by the mobile communication network 105 receiving an incoming message (e.g., a telephone call) directed to a particular mobile terminal 110 at step 210. Receptions of incoming messages by mobile communication networks are well known in the art.

At step 220, the last reported location area 160 for the particular mobile terminal 110 is identified. The location area 160 may be identified by retrieving the last reported location data from a data store (not shown) of the location management system 100.

At step 230, location probability data associated with the particular mobile terminal 110 is retrieved. The data may be retrieved from a data store (not shown) of the location management system 100 and may include a set of quantified probabilities of the particular mobile terminal 110 being located the cells 140 of the location area 160. Preferably, the retrieved probability distribution is indexed in non-ascending order of location probability values, as discussed above (e.g., see Table 1).

The retrieved set of location probabilities may be referred to as "P." The set P may be defined as $\{p_j, p_{j+1}, \ldots p_N\}$ where "N" is the number of cells in the location area 160 under consideration, and $p_j$ is the probability of locating the particular mobile terminal 110 in cell 140-$j$. The set P may be formed by ordering the cells in an non-ascending order according to their location probabilities. The sum of all elements of the set P is equal to a value of "1."

At step 240, a threshold is set by summing the retrieved location probabilities and dividing the sum by a predetermined delay bound ("D"). As discussed above, the delay bound represents the maximum number of polling cycles allowed before mobile terminal 110 is located. The delay bound should be no less than a value of "1" and no greater than the number ("N") of cells 140 in the location area 160 under consideration (i.e., $1 \leq D \leq N$). Step 240 will be explained in more detail below, with reference to a particular example.

At step 250, paging areas 170 are formed one at a time based on the threshold until there are no remaining ungrouped cells 140 in the location area 160. For example, step 250 may involve starting with the first indexed cell 140-1 and adding it to a first paging area 170-1. The total location probabilities of the cells in the paging area 170-1 (in this case only the first cell 140-1 is in the paging area 170-1) is compared to the threshold. If the total is equal to or exceeds the threshold, then creation of the paging area 170-1 is complete, and the first cell 140-1 remains the only cell in the paging area 170-1.

On the other hand, if the location probability of the first cell 140 is less than the threshold, then the next subsequent cell 140-2 will be added to the first paging area 170-1. If the sum of the location probabilities of the first two cells 140-1 and 140-2 is greater than or equal to the threshold, then formation of the first paging area 170-1 is stopped with the first two cells 140-1 and 140-2 contained therein.

The second paging area 170-2 will then be formed in similar manner beginning with the next sequentially indexed cell 140 that has not yet been grouped into the first paging area 170-1. This process continues until there are no ungrouped cells 140 remaining in the location area 160. In this manner, paging areas 170 are formed one at a time based on the location probabilities of the cells 140 until every one of the cells 140 of the location area 160 has been partitioned into a paging area 170. In other words, step 250 partitions the "N" number of cells 140 of the location area 160 into "D" number of paging areas 170, with the sizes of the paging areas 170 being determined based on the location probabilities of the cells 140. Step 250 will be explained in more detail below, with reference to a particular example.

Once the paging areas 170 have been formed, in step 255 the paging area information is provided to MSC 150 in order to be used in a polling operation.

Step 260 is performed by sequentially polling (i.e., broadcasting paging messages) the paging areas 170 until the particular mobile terminal 110 is located. The MSC 150 may selectively direct the base stations 120 to perform the sequential broadcasts. In some embodiments, the paging areas 170 are polled in the same order that the paging areas 170 were formed. Because the paging areas 170 were formed using a set of cells 140 indexed in non-ascending order of location probabilities, the system 100 is able to poll the paging areas 170 in an order that prioritizes cells 140 having relatively high location probabilities. This increases the chances of mobile terminals 110 being located early in a sequential polling process, thereby helping to minimize the number of polling cycles needed to locate the wireless terminals 110.

Figure 3:
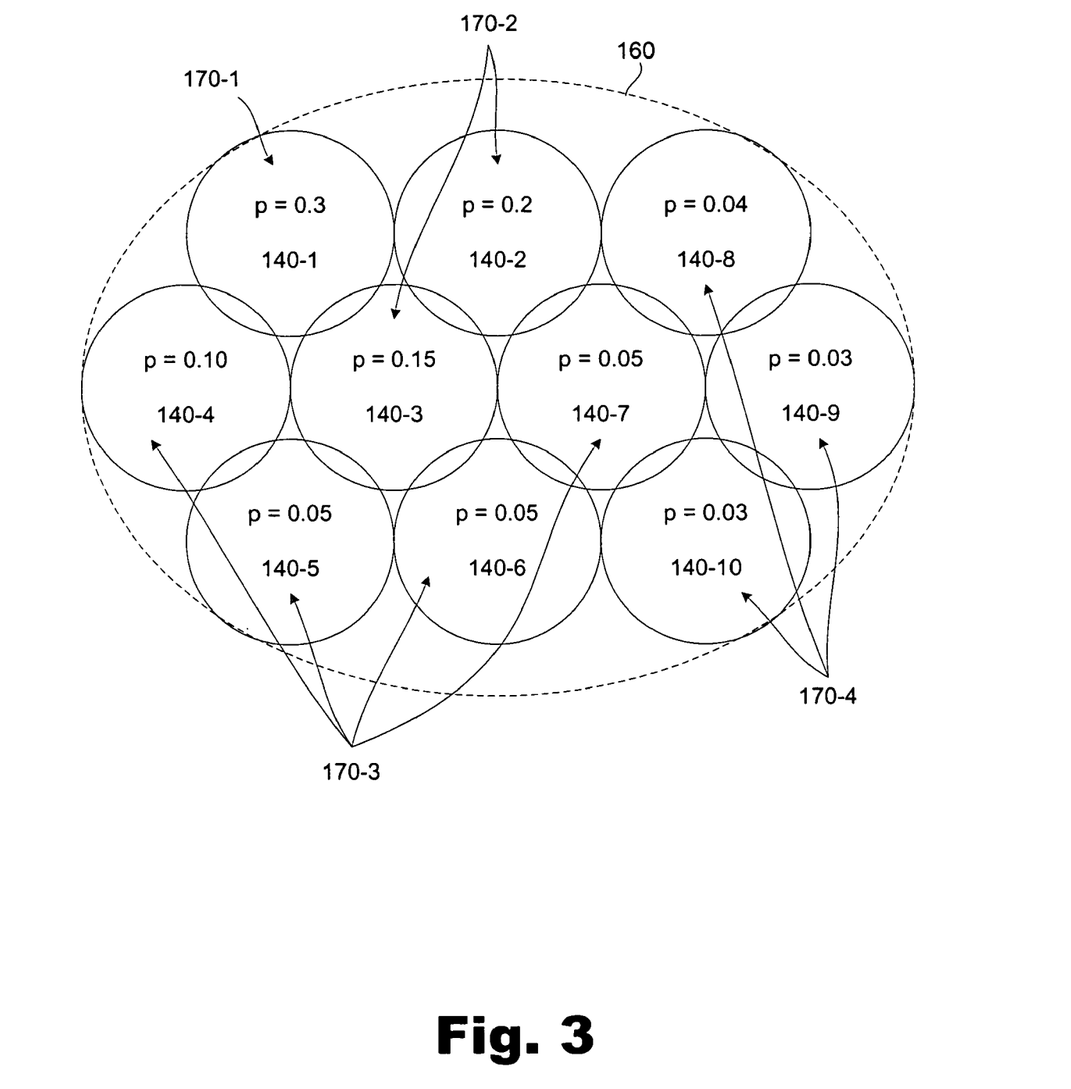
FIG. 3 illustrates an example of cells of a location area grouped into exemplary paging areas using the process of FIG. 2.

A particular application of steps 240-260 of FIG. 2 to a given set of location probability data will now be described with reference to FIG. 3. FIG. 3 illustrates an example of a location area 160 having ten cells 140-1 through 140-10 partitioned into paging areas 170-1 through 170-4. The ten cells 140-1 through 140-10 shown in FIG. 3 have the same location probability ("p") values listed above in Table 1. At step 240, a threshold is set by summing the location probabilities of the ten cells 140-1 through 140-10 and dividing the sum by a predetermined delay bound. The sum of the location probabilities of the cells 140-1 through 140-10 has a value of "one." Assuming the delay bound has been predefined to have a value of "four" (i.e., a maximum delay of four polling cycles), the threshold is determined to have a value of "0.25" at step 240.

At step 250, paging areas 170 are formed one at a time using the threshold. For the first paging area 170-1, step 250 begins with the first cell 140-1. The system 100 determines that the location probability (0.3) of the cell 140-1 is greater than the threshold (0.25), meaning that cell 140-1 completes the first paging area 170-1. As shown in FIG. 3, cell 140-1 is the only member of paging area 170-1.

Because there are still ungrouped cells 140-2 through 140-10 remaining, the system 100 forms the second paging area 170-2 beginning with the next indexed and ungrouped cell, which is cell 140-2. The location probability (0.2) of cell 140-2 is less than the threshold (0.25). Consequently, the next indexed cell 140-3 is also added to paging area 170-2. The sum of the location probabilities of cells 140-2 and 140-3 (0.2+0.15=0.35) is now greater than the threshold (0.25), meaning that cells 140-2 and 140-3 complete the second paging area 170-2. As shown in FIG. 3, cells 140-2 and 140-3 are the only members of the paging area 170-2.

Because there are still ungrouped cells 140-4 through 140-10 remaining, the system 100 forms a third paging area 170-3 beginning with the next indexed and ungrouped cell, which is cell 140-4. The location probability (0.10) of cell 140-4 is less than the threshold (0.25). Consequently, the next indexed cell 140-5 is also added to paging area 170-3. Subsequent cells 140-6 and 140-7 are also added to the paging area 170-3 before the sum (0.25) of the location probabilities of the cells in paging area 170-3 reaches the threshold (0.25). As shown in FIG. 3, cells 140-4 through 140-7 are the only members of paging area 170-3.

In similar fashion, the remaining cells 140-8 through 140-10 are added to a fourth and final paging area 170-4, bringing the total number of formed paging areas 170 to four, the same value as the delay bound. By using the predetermined delay bound to set the threshold in step 240, the number of formed paging areas 170 will not exceed the delay bound. This means that the number of polling cycles (one per each paging area 170) will not exceed the delay bound before any mobile terminal 110 is located.

The formed paging areas 170 are sequentially polled as described above. The polling sequence may be the same sequence in which the paging areas 170 were formed. For the paging areas 170-1 through 170-4 of FIG. 3, for example, the polling sequence may page paging area 170-1 first, paging area 170-2 second, paging area 170-3 third, and paging area 170-4 fourth. Because the paging areas 170-1 and 170-2 contain relatively higher location probability cells 140-1 through 140-3, chances favor finding the mobile terminal 110 early in the polling sequence. This effectively decreases the average number of polling cycles that are performed to locate mobile terminals 110, thereby reducing expected paging costs while maintaining delay within the predetermined delay bound. In addition, paging costs are also generally reduced because the first-formed paging areas (e.g., the paging areas 170-1 and 170-2) tend to include fewer numbers of cells 140 than later-formed paging areas (e.g., the paging areas 170-3 and 1704). Thus, the system 100 generally helps to reduce the number of cells 140 polled to find mobile terminals 110 located in the first-formed paging areas 170.

IV. Performance Analyses

This section discusses numerical-based analyses of the performance of the exemplary process of locating mobile terminals 170 by constructing paging areas 170 as discussed above in relation to FIG. 2. In this section, the exemplary process of FIG. 2 is referred to as "Equal Paging" ("EP"). The numerical analyses illustrate the effectiveness of EP in reducing expected paging costs and controlling paging delays for a variety of different location probability distributions that may occur in mobile communication networks.

Expected paging costs ("E[C(B)]") may be measured according to Equation 1, and expected delay costs ("E[D(B)]") may be measured according to Equation 2, where B denotes the delay bound, $q_i$ denotes location probability, and $n_i$ denotes the number of cells in the corresponding paging area ("$PA_i$"). Accordingly, the location probability of the $q_i$ of $PA_i$ is $$q_i = \sum_{j \in PA_i} p_j.$$

$$E[C(B)] = \sum_{i=1}^{E} q_i \sum_{k=1}^{i} n_k \qquad \text{Equation 1}$$

$$E[D(B)] = \sum_{i=1}^{B} i q_i \qquad \text{Equation 2}$$

The numerical analyses described below have been calculated for four different types of location probability distributions—Uniform, Truncated Gaussian, Irregular, and Irregular Long Tail. Uniform, Truncated Gaussian, and Irregular probability distributions are described in "Effective Paging Schemes with Delay Bounds as QoS Constraints in Wireless Systems," by W. Wang, I. Akyildiz, and G. Stuber, Wireless Networks 7, pp. 455-466, 2001, the contents of which are hereby incorporated by reference in their entirety. This article is hereinafter referred to as the Wang article.

In the numerical analyses, three known paging heuristics are used as benchmarks for evaluating the effectiveness of the Equal Paging process. These three benchmark heuristics include Reverse Paging ("RP"), Semi-Reverse Paging ("SP"), and Uniform Paging ("UP"), as described in the Wang article.

Analyses have been performed for two different sizes of location areas 160, namely for location areas 160 having ten and twenty cells 140. For each size of location area 160, the delay bound ("B") is varied between values of three, four, and five. For each combination of location area size and delay bound, ten instances of mobile terminal 110 location probabilities are used for Uniform and Truncated Gaussian distributions, while three instances of mobile terminal 110 location probabilities are used for Irregular and Irregular Long Tail distributions. The performance of EP and the three benchmark heuristics are calculated using Equation 1 and Equation 2, and the average measures over ten instances or three instances are reported in FIGS. 4A through 9B.

A. Uniform Location Probability Distributions

Figure 4A:
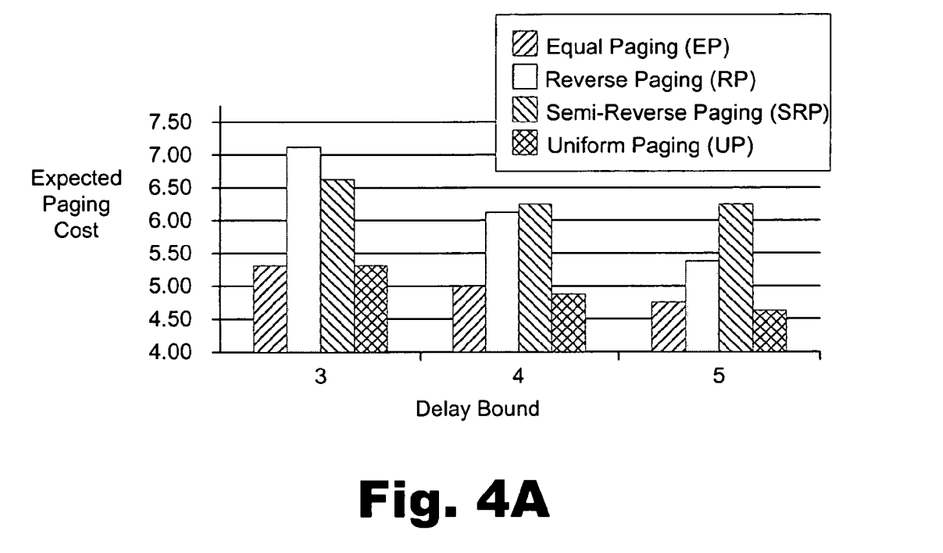
FIG. 4A is a chart illustrating examples of average expected paging costs (expected number of cells paged before the mobile terminal is found) produced by several paging techniques when applied to a location area having ten cells exhibiting various uniform probability distributions.
Figure 4B:
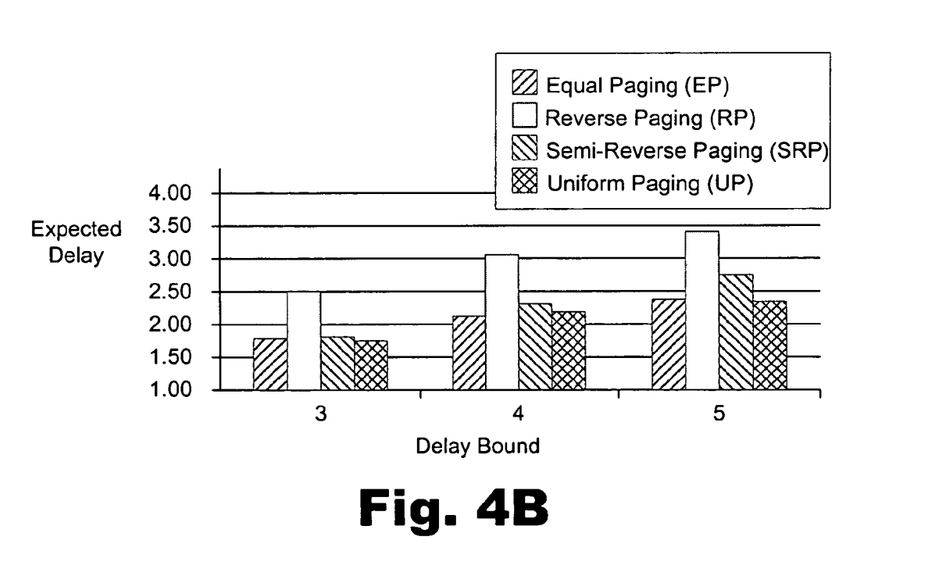
FIG. 4B is a chart illustrating examples of average expected delays (expected number of paging areas polled before the mobile terminal is found) produced by several paging techniques when applied to a location area having ten cells exhibiting various uniform probability distributions.

FIGS. 4A and 4B are charts illustrating calculated average performance of EP when applied to ten instances of uniform location probability distributions for a location area 160 having ten cells 140. Results are provided for delay bound values of three, four, and five. FIG. 4A illustrates the expected paging costs, and FIG. 4B illustrates the expected delays.

As shown in FIGS. 4A and 4B, as the delay bound value increases, the expected paging costs decrease and the expected delays increase for all four paging heuristics. EP and the UP heuristic provide comparable performance, and EP consistently outperforms the RP and SP heuristics for all delay bound values. Table 2 lists the average performance results illustrated in FIGS. 4A and 4B.

TABLE 2

Results for Uniform Probability Distributions when n = 10

| n = 10 | Expected Paging Cost | | | Expected Delay | | |
|---|---|---|---|---|---|---|
| Delay Bound | 3 | 4 | 5 | 3 | 4 | 5 |
| Equal Paging | 5.37 | 4.97 | 4.84 | 1.81 | 2.14 | 2.37 |
| Reverse Paging | 7.12 | 6.18 | 5.39 | 2.50 | 3.02 | 3.42 |
| Semi Reverse Paging | 6.70 | 6.30 | 6.24 | 1.85 | 2.28 | 2.72 |
| Uniform Paging | 5.37 | 4.90 | 4.68 | 1.73 | 2.19 | 2.34 |

Figure 5A:
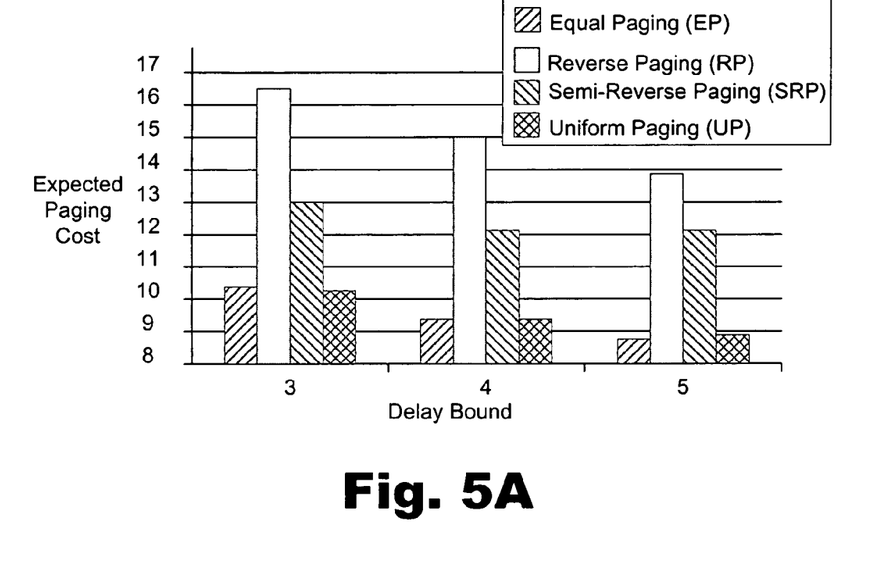
FIG. 5A is a chart illustrating examples of average expected paging costs produced by several paging techniques when applied to a location area having twenty cells exhibiting various uniform probability distributions.
Figure 5B:
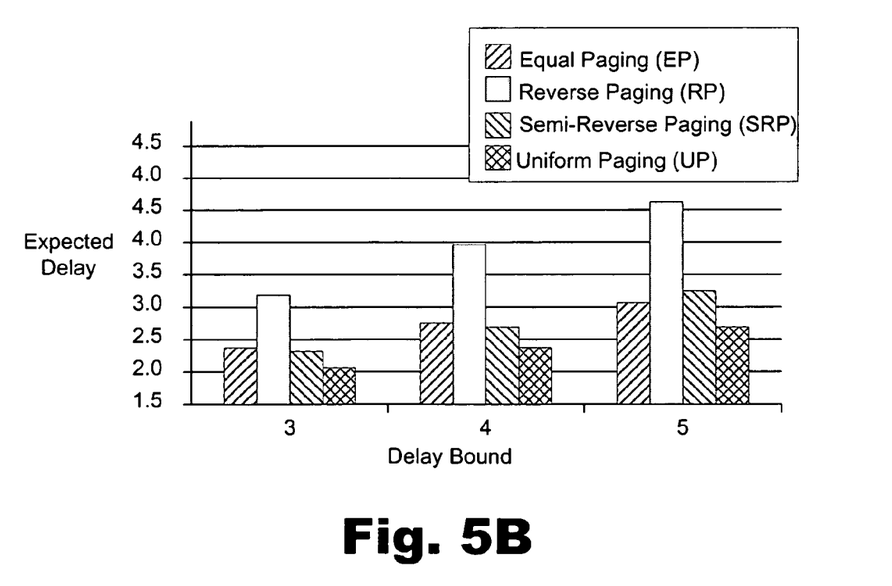
FIG. 5B is a chart illustrating examples of average expected delays produced by several paging techniques when applied to a location area having twenty cells exhibiting various uniform probability distributions.

FIGS. 5A and 5B illustrate the calculated average performance of the four paging heuristics when the size of the location area 160 is twenty cells 140. The same ten instances of uniform location probability distributions are used. FIG. 5A illustrates the expected paging costs, and FIG. 5B illustrates the expected delays. As shown in FIGS. 5A and 5B, the results are similar to those shown in FIGS. 4A and 4B inasmuch as EP is comparable to the UP heuristic and outperforms the RP and SP heuristics. Table 3 lists the average performance results of illustrated in FIGS. 5A and 5B.

TABLE 3

Results for Uniform Probability Distributions when n = 20

| n = 20 | Expected Paging Cost | | | Expected Delay | | |
|---|---|---|---|---|---|---|
| Delay Bound | 3 | 4 | 5 | 3 | 4 | 5 |
| Equal Paging | 10.42 | 9.32 | 8.75 | 1.90 | 2.32 | 2.58 |
| Reverse Paging | 16.54 | 15.05 | 13.73 | 2.72 | 3.44 | 4.09 |
| Semi Reverse Paging | 13.01 | 13.11 | 12.10 | 1.86 | 2.26 | 2.74 |
| Uniform Paging | 10.28 | 9.40 | 8.81 | 1.61 | 1.88 | 2.20 |

B. Truncated Discrete Gaussian Probability Distributions

Figure 6A:
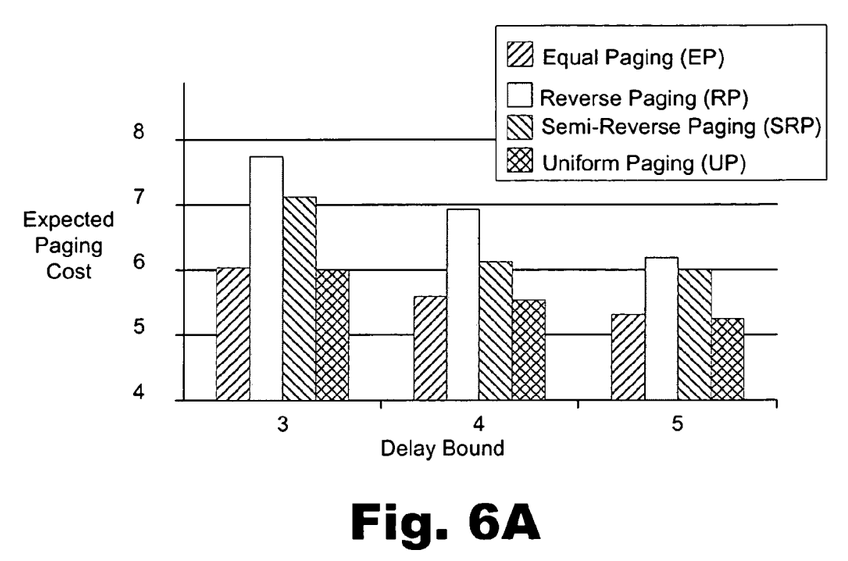
FIG. 6A is a chart illustrating examples of average expected paging costs produced by several paging techniques when applied to a location area having ten cells exhibiting truncated Gaussian probability distributions.
Figure 6B:
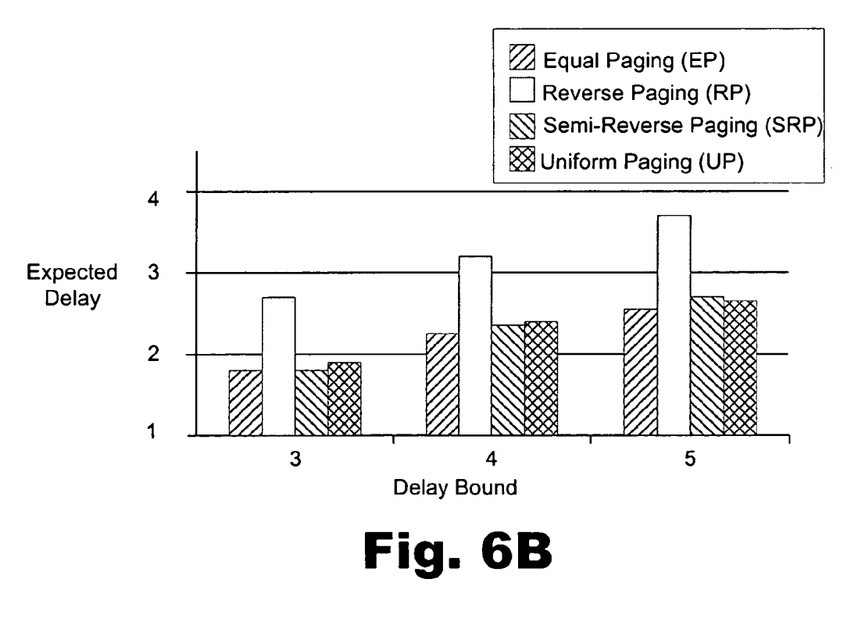
FIG. 6B is a chart illustrating examples of average expected delays produced by several paging techniques when applied to a location area having ten cells exhibiting truncated Gaussian probability distributions.

FIGS. 6A and 6B illustrate calculated average performances of EP when applied to ten instances of truncated discrete Gaussian probability distributions for a location area 160 having ten cells 140. Results are provided for delay bound values of three, four, and five. FIG. 6A illustrates the expected paging costs, and FIG. 6B illustrates the expected delays.

Equation 3 was used to generate Gaussian location probability distributions, in which t is set to a value of "50" and σ is set to a value of "1." Equation 3 is described in "Minimizing the Average Cost of Paging Under Delay Constraints, by C. Rose and R. Yates, Wireless Networks, 1, pp. 211-219, 1995, the contents of which are incorporated by reference in their entirety. This article is hereinafter referred to as the Rose article.

$$p_j = \frac{1}{\text{erf}\left(\frac{n}{\sqrt{t\sigma^2}}\right)} \frac{2}{\sqrt{2\pi t\sigma^2}} \int_{j-1}^{j} e^{-\frac{x^2}{2t\sigma^2}} dx \qquad \text{Equation 3}$$

As shown in FIGS. 6A and 6B, as the delay bound value increases, the expected paging costs decrease and the expected delays increase for all four paging heuristics. EP and the UP heuristic again provide comparable results, with EP providing better (i.e., lower) expected delays than the UP heuristic. EP consistently provides better expected paging cost results than the RP and SP heuristics for all delay bound values. Table 4 lists the average performance results illustrated in FIGS. 6A and 6B.

TABLE 4

Results for Truncated Gaussian Probability Distributions when n = 10

| n = 10 | Expected Paging Cost | | | Expected Delay | | |
|---|---|---|---|---|---|---|
| Delay Bound | 3 | 4 | 5 | 3 | 4 | 5 |
| Equal Paging | 6.03 | 5.59 | 5.36 | 1.81 | 2.24 | 2.57 |
| Reverse Paging | 7.75 | 6.87 | 6.16 | 2.60 | 3.21 | 3.70 |
| Semi Reverse Paging | 7.18 | 6.16 | 5.97 | 1.81 | 2.36 | 2.68 |
| Uniform Paging | 5.96 | 5.53 | 5.26 | 1.89 | 2.42 | 2.63 |

Figure 7A:
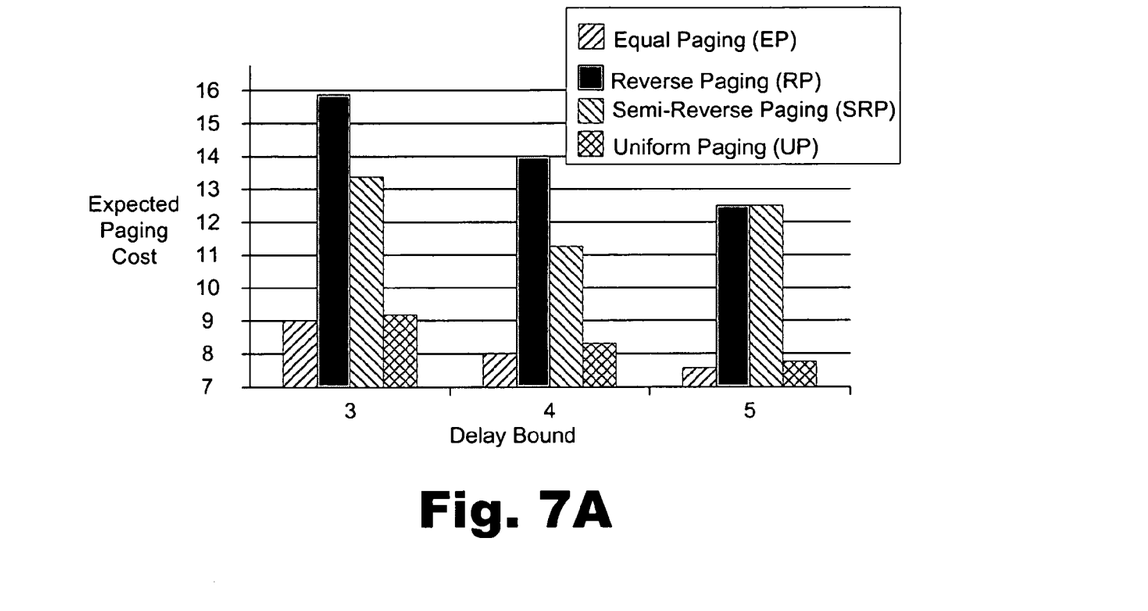
FIG. 7A is a chart illustrating examples of average expected paging costs produced by several paging techniques when applied to a location area having twenty cells exhibiting truncated Gaussian probability distributions.
Figure 7B:
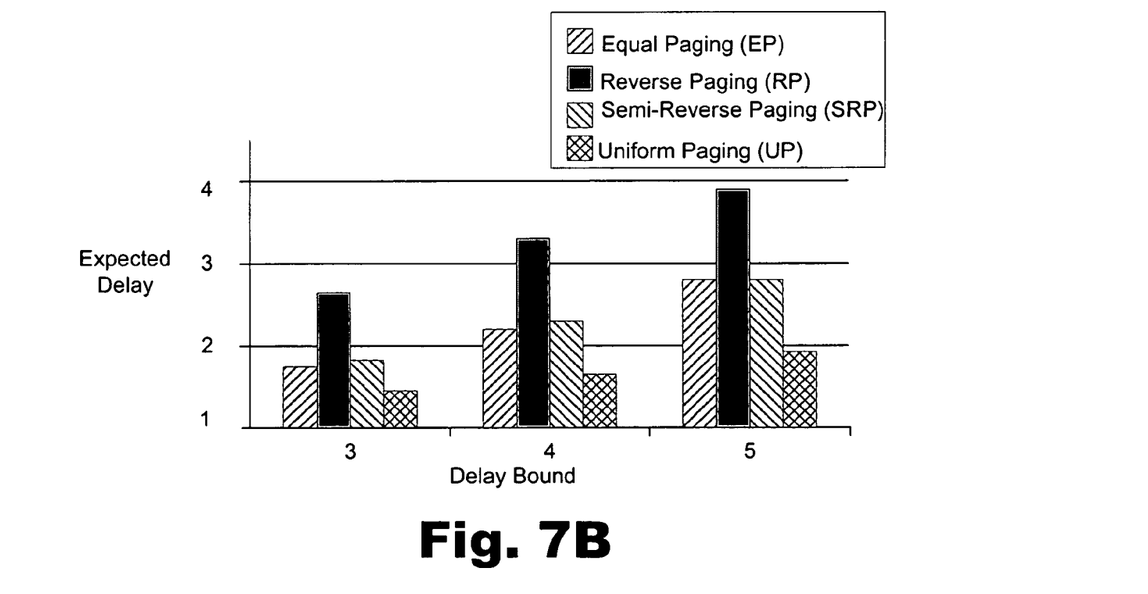
FIG. 7B is a chart illustrating an example of average expected delays produced by several paging techniques when applied to a location area having twenty cells exhibiting truncated Gaussian probability distributions.

FIGS. 7A and 7B illustrate the calculated average performance of the four heuristics for the same Gaussian probability distributions for a location area size of twenty cells 140. As shown in FIGS. 7 and 7B, EP performs produces slightly better expected paging costs than the UP heuristic for all three delay bound values. However, the UP heuristic produces smaller expected delays. Both EP and the UP heuristic continue to outperform the RP and SP heuristics in both expected paging costs and delays. Table 5 lists the average performance results of illustrated in FIGS. 7A and 7B.

TABLE 5

Results for Truncated Gaussian Probability Distributions when n = 20

| n = 20 | Expected Paging Cost | | | Expected Delay | | |
|---|---|---|---|---|---|---|
| Delay Bound | 3 | 4 | 5 | 3 | 4 | 5 |
| Equal Paging | 9.04 | 8.02 | 7.58 | 1.77 | 2.18 | 2.78 |
| Reverse Paging | 15.86 | 14.05 | 12.45 | 2.66 | 3.33 | 3.90 |
| Semi Reverse Paging | 13.36 | 11.27 | 12.43 | 1.82 | 2.29 | 2.79 |
| Uniform Paging | 9.18 | 8.30 | 7.71 | 1.45 | 1.66 | 1.93 |

C. Irregular Location Probability Distributions

Figure 8A:
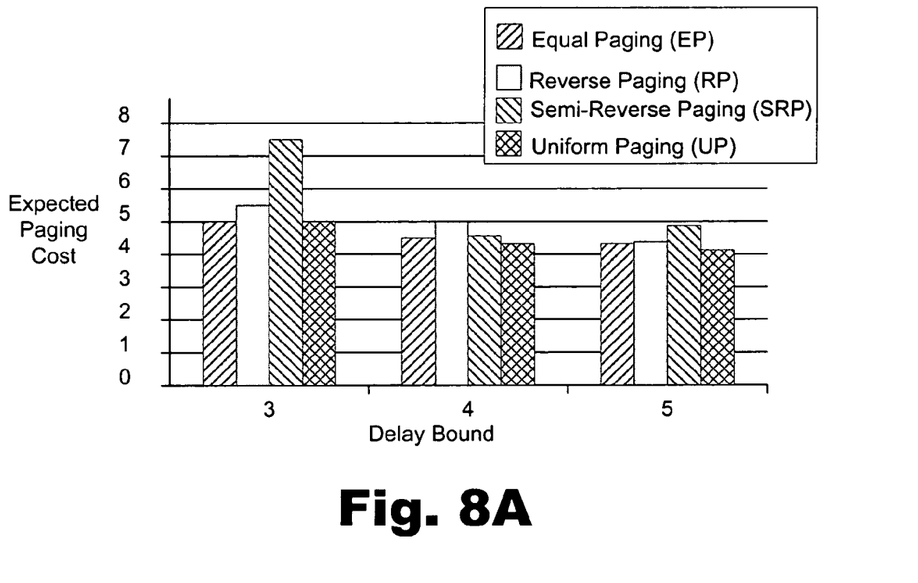
FIG. 8A is a chart illustrating examples of average expected paging costs produced by several paging techniques when applied to a location area having ten cells exhibiting irregular probability distributions.
Figure 8B:
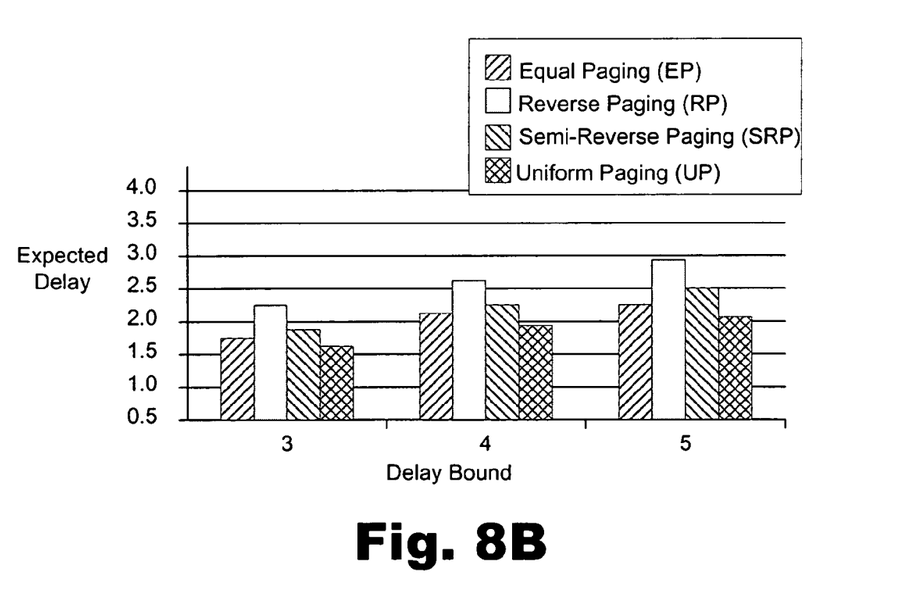
FIG. 8B is a chart illustrating examples of average expected delays produced by several paging techniques when applied to a location area having ten cells exhibiting irregular probability distributions.

FIGS. 8A and 8B illustrate calculated average performances of EP when applied to three irregular probability distributions for a location area 160 having ten cells 140. Again, results are provided for delay bound values of three, four, and five. FIG. 8A illustrates the expected paging costs, and FIG. 8B illustrates the expected delays. The three irregular probability distribution sets used in this analysis are listed in Table 6 and identified as "Case A," "Case B," and "Case C."

TABLE 6

Irregular Location Probability Distribution when n = 10

| Cell | 1 | 2 | 3 | 4 | 5 |
|---|---|---|---|---|---|
| Case A | 0.36 | 0.31 | 0.05 | 0.05 | 0.045 |
| Case B | 0.16 | 0.16 | 0.16 | 0.16 | 0.06 |
| Case C | 0.28 | 0.26 | 0.08 | 0.08 | 0.05 |

| Cell | 6 | 7 | 8 | 9 | 10 |
|---|---|---|---|---|---|
| Case A | 0.045 | 0.04 | 0.04 | 0.03 | 0.03 |
| Case B | 0.06 | 0.06 | 0.06 | 0.06 | 0.06 |
| Case C | 0.05 | 0.05 | 0.05 | 0.05 | 0.05 |

As shown in FIGS. 5A and 8B, as the delay bound value increases, the expected paging costs decrease and the expected delays increase for all four paging heuristics. EP and the UP heuristic again provide comparable results, with the UP heuristic providing slightly better (i.e., lower) expected delays. The RP heuristic produced expected paging costs that are somewhat comparable to the expected paging costs produced by EP and the UP heuristic. However, the RP process also produced the worst expected delays of the four heuristics, under all delay bound values. Table 7 lists the average performance results illustrated in FIGS. 8A and 8B.

TABLE 7

Results for Irregular Location Probability Distributions when n = 10

| n = 10 | Expected Paging Cost | | | Expected Delay | | |
|---|---|---|---|---|---|---|
| Delay Bound | 3 | 4 | 5 | 3 | 4 | 5 |
| Equal Paging | 4.94 | 4.44 | 4.33 | 1.73 | 2.17 | 2.22 |
| Reverse Paging | 5.65 | 4.98 | 4.40 | 2.22 | 2.62 | 2.91 |
| Semi Reverse Paging | 7.42 | 4.56 | 4.88 | 1.88 | 2.24 | 2.49 |
| Uniform Paging | 4.95 | 4.30 | 4.15 | 1.59 | 1.93 | 2.07 |

D. Irregular Long-Tail Location Probability Distributions

Figure 9A:
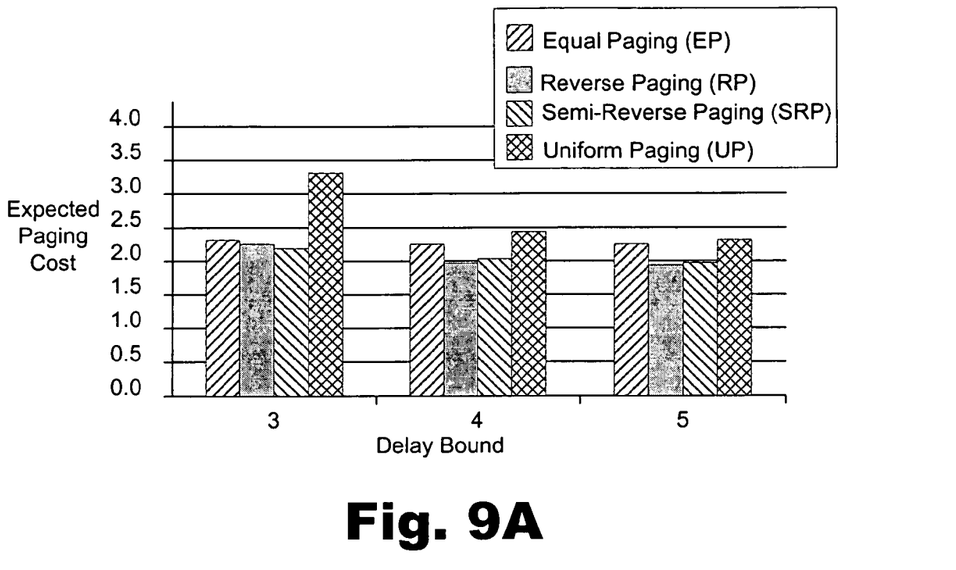
FIG. 9A is a chart illustrating examples of average expected paging costs produced by several paging techniques when applied to a location area having ten cells exhibiting irregular long-tail probability distributions.
Figure 9B:
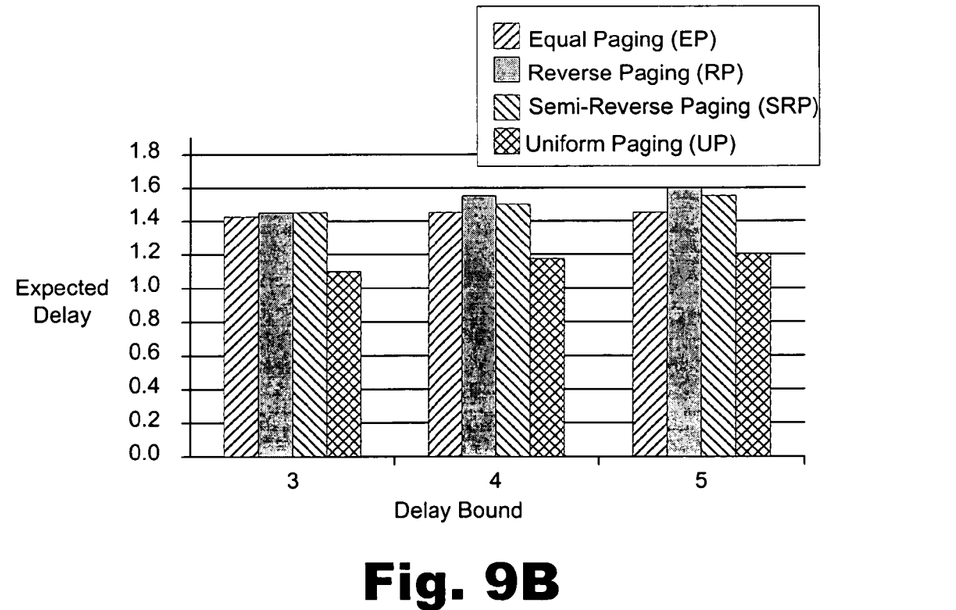
FIG. 9B is a chart illustrating examples of average expected delays produced by several paging techniques when applied to a location area having ten cells exhibiting irregular long-tail probability distributions.

FIGS. 9A and 9B illustrate calculated average performances of EP when applied to three irregular long-tail probability distributions for a location area 160 having ten cells 140. Again, results are provided for delay bound values of three, four, and five. FIG. 9A illustrates the expected paging costs, and FIG. 9B illustrates the expected delays. The three irregular long-tail probability distribution sets used in this analysis are listed in Table 8 and identified as "Case A," "Case B," and "Case C."

TABLE 8

Irregular Long-Tail Location Probability Distribution when n = 10

| cell | 1 | 2 | 3 | 4 | 5 |
|---|---|---|---|---|---|
| case A | 0.8991 | 0.0298 | 0.0205 | 0.0158 | 0.0141 |
| case B | 0.4496 | 0.4033 | 0.0474 | 0.0218 | 0.0191 |
| case C | 0.5785 | 0.3252 | 0.0288 | 0.0175 | 0.0137 |

| cell | 6 | 7 | 8 | 9 | 10 |
|---|---|---|---|---|---|
| case A | 0.0132 | 0.0051 | 0.0012 | 0.0006 | 0.0005 |
| case B | 0.0163 | 0.0153 | 0.0131 | 0.0088 | 0.0054 |
| case C | 0.0109 | 0.0101 | 0.0075 | 0.0065 | 0.0013 |

As shown in Table 8, irregular long-tail distributions generally include a small number of cells (e.g., one or two cells) having significant probability values and a large number of cells having nearly insignificant probability values. Thus, irregular long-tail distributions may be used to represent very common mobile terminal 110 location patterns. In particular, many users of mobile terminals 110 spend significant amounts of time at one or two locations (e.g., at work during the day and at home during the night). With this type of travel pattern, there is a high probability, at any time of the day, that the mobile terminal 110 will be located in one of a small number of high probability cells 140 of the location area 160.

As shown in FIGS. 9A and 9B, as the delay bound value increases, the expected paging costs generally decrease and the expected delays generally increase for all four paging heuristics. EP and the UP heuristic again provide somewhat comparable results, with the UP heuristic providing lower expected delays. In general, as the number of "high location probability value" cells in a cell set decreases, EP tends to perform increasingly better than the UP heuristic. At a delay bound value of three, EP provides significantly lower expected paging costs that those produced by the UP heuristic.

FIG. 9A shows that the RP and SRP heuristics produced lower expected paging costs than those produced by EP and the UP heuristic. However, FIG. 9B shows that the RP and SRP heuristics also produced the worst expected delays of the four heuristics, for each of the delay bound values. Table 9 lists the average performance results illustrated in FIGS. 9A and 9B.

TABLE 9

Results for Irregular Long Tail Probability Distributions when n = 10

| n = 10 | Expected Paging Cost | | | Expected Delay | | |
|---|---|---|---|---|---|---|
| Delay Bound | B = 3 | B = 4 | B = 5 | 3 | 4 | 5 |
| EP | 2.32 | 2.28 | 2.28 | 1.43 | 1.44 | 1.44 |
| RP | 2.20 | 1.97 | 1.86 | 1.46 | 1.54 | 1.59 |
| SRP | 2.16 | 2.02 | 1.98 | 1.45 | 1.50 | 1.55 |
| UP | 3.32 | 2.42 | 2.38 | 1.10 | 1.17 | 1.19 |

In conclusion, the system and method disclosed herein provide an effective location management tool capable of locating mobile terminals in location areas of mobile communication networks in a manner that reduces the average number of paging cycles while maintaining delays within a predetermined delay bound. As shown in the numerical analyses described above, Equal Paging robustly produces effective results (i.e., reduced expected paging costs within delay bounds) for a wide range of location probability distributions. Moreover, Equal Paging outperforms, or performs comparably to, several other paging heuristics, in terms of expected paging costs and delays, for many different sets of probability distributions. Equal Paging provides network designers with an effective and simple location management option that is capable of reducing bandwidth costs associated with paging operations while keeping paging delay within predefined limits.

V. Alternative Embodiments

The preceding description has been presented only to illustrate and describe embodiments of the invention, It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A method comprising:
    setting a threshold by
        calculating a sum of location probabilities of cells in a location area of a mobile communication network, and
        dividing said sum by a maximum number of polling cycles allowed before a mobile terminal is located;
    ordering the cells in the location area in non-ascending order according to their location probabilities; and
    forming multiple paging areas one at a time by
        starting with a first cell not used in a previous paging area,
        grouping cells in order, and
        stopping formation of each of said multiple paging areas when a total of location probabilities in same said paging area reaches said threshold or when no more ungrouped cells exist within the location area.

2. The method as recited in claim 1, further comprising a step of polling said paging areas, one after another, in the same order as said paging areas being formed until the mobile terminal is located within the location area.

3. The method as recited in claim 1, wherein said maximum number of polling cycles is predetermined based on a Quality of Service ("QoS") requirement of the mobile communication network.

4. The method as recited in claim 1, wherein the cells of the location area are indexed in non-ascending order of location probability value.

5. The method as recited in claim 1, wherein said multiple paging areas are equal in number to said maximum number of polling cycles.

6. A method comprising:
    ordering a plurality of cells of a location area of a mobile communication network in non-ascending order according to their location probabilities;
    forming multiple paging areas one at a time by
        starting with a first cell not used in a previous paging area,
        grouping cells in order, and
        stopping creation of each one of said multiple paging areas when a total of location probabilities associated with the cells grouped in same said paging area reaches a threshold or when no more ungrouped cells exist within the location area;
    polling said multiple paging areas in the same order as said multiple paging areas are formed until a mobile terminal is located within the location area; and
    setting said threshold by
        calculating a sum of all location probabilities associated with the plurality of cells in the location area, and
        dividing said sum by a maximum number of polling cycles allowed before the mobile terminal is located.

7. The method as recited in claim 6, wherein said maximum number of polling cycles is predetermined based on a Quality of Service ("QoS") requirement of the mobile communication network.

8. The method as recited in claim 6, wherein said multiple paging areas are equal in number to the maximum number of polling cycles.

9. The method as recited in claim 6, wherein the location probabilities of the plurality of cells in the location area are indexed by cell in non-ascending order of location probability value.

10. A system comprising:
    a location area having a plurality of cells, each of said cells being assigned a location probability;
    paging areas formed from subsets of said cells within said location area, wherein each, or all except one, of said paging areas is comprised of a group of said cells whose total location probability meets a threshold, said threshold includes a consideration of a maximum number of polling cycles allowed before said mobile terminal is located, and said threshold is defined as a sum of the location probabilities of said plurality of cells in said location area divided by said maximum number of polling cycles;
    a mobile terminal within said location area; and
    a mechanism for forming and polling said paging areas until said mobile terminal is located.

11. A system as recited in claim 10, wherein said mechanism is configured to poll said paging areas in the same order in which said paging areas are formed.

12. A tangible processor-readable medium having instructions configured to instruct a processor to perform the steps of:
    setting a threshold by
        calculating a sum of all location probabilities of cells in a location area of a mobile communication network, and
        dividing said sum by a maximum number of polling cycles allowed before a mobile terminal is located;
    ordering the plurality of cells in non-ascending order according to their location probabilities; and
    forming multiple paging areas one at a time by
        starting with a first cell not used in a previous paging area,
        grouping cells in order, and
        stopping formation of each of said multiple paging areas when a total of location probabilities associated with the cells grouped in same said paging area reaches said threshold or when no more ungrouped cells exist within the location area.

13. A tangible processor-readable medium as recited in claim 12, wherein said instructions are further configured to perform a step of polling said paging areas, one after another, in the same order as said paging areas being formed until the mobile terminal is located within the location area.

* * * * *